United States Patent [19]

Choi

[11] Patent Number: 5,039,204

[45] Date of Patent: Aug. 13, 1991

[54] COLOR FILTER LAYER OF A LIQUID CRYSTAL DISPLAY

[75] Inventor: Kwangsu Choi, Suwon, Rep. of Korea

[73] Assignee: Samsung Electron Devices Co. Ltd., Rep. of Korea

[21] Appl. No.: 527,357

[22] Filed: May 23, 1990

[30] Foreign Application Priority Data

Dec. 30, 1989 [KR] Rep. of Korea ............ 89-20481

[51] Int. Cl.$^5$ ............................................. G02F 1/133
[52] U.S. Cl. ............................................. 359/67; 359/68
[58] Field of Search ................ 350/339 R, 339 F, 333

[56] References Cited

U.S. PATENT DOCUMENTS

| | | | |
|---|---|---|---|
| 4,653,862 | 3/1987 | Morozumi | 350/339 R |
| 4,733,948 | 3/1988 | Kitahara | 350/339 F |
| 4,853,296 | 8/1989 | Fukuyoshi | 350/339 F |
| 4,867,537 | 9/1989 | Acki et al. | 350/339 F |
| 4,881,797 | 11/1989 | Aoki et al. | 350/339 F |
| 4,934,791 | 6/1990 | Shimizu et al. | 350/339 R |

*Primary Examiner*—Stanley D. Miller
*Assistant Examiner*—Anita Pellman Gross
*Attorney, Agent, or Firm*—Cushman, Darby & Cushman

[57] ABSTRACT

In a liquid crystal display comprising upper and lower transparent glass substrates, an array of thin film transistors and a liquid crystal layer sealingly filled between said upper and lower glass substrates, a color filter layer if provided, comprising, a plurality of color filters laid in a mosaic pattern on the upper glass substrate, said color filters comprising red, green and blue dyes said color filter layer further comprising, a black matrix disposed between said color filters to block the light rays incident between them, and lower glass substrates, a color filter layer comprising a said black matrix having a three-layer structure comprising a silicon nitride film, a light absorbing layer and a chromium layer sequentially deposited on said upper glass substrate.

2 Claims, 1 Drawing Sheet

COLOR FILTER LAYER OF A LIQUID CRYSTAL DISPLAY

BACKGROUND OF THE INVENTION

The present invention relates to a color filter layer of a liquid crystal display, and particularly to a color filter layer having black matrix comprising a light absorbing layer which doesn't scatter incident light rays.

Generally, the liquid crystal display for a pocket-sized or portable color television or computer has the form of a liquid crystal panel comprising color filters and thin film transistors, the construction of which is schematically illustrated in FIG. 1.

Namely, the liquid crystal display comprises a lower transparent glass substrate 10, an array of polycrystalline or amorphous silicon thin film transistors formed on the lower glass substrate, an upper transparent glass substrate 60, a color filter layer 50 of red, green and blue formed on the upper glass substrate, and a liquid crystal layer 30 sealingly filled between the two glass substrates.

Between the color filter layer 50 and the liquid crystal layer 30 a common electrode 40 of transparent indium tin oxide (ITO) is interposed. Each of the pixels of the liquid crystal panel contains a thin film transistor 20, which is controlled to turn on/off the pixel.

The present invention relates more specifically to the color filter layer 50.

The conventional color filter layer is illustrated in FIG. 2.

Referring to FIG. 2, each of the pixels of the color filter layer 50 formed on the upper transparent glass substrate 60 comprises dyes of red, green and blue patterned in a mosaic (linearly patterned in the drawing). The color filters of red, green and blue 52R, 52G, 52B may be formed by the conventional printing method or the photo-sensitive filming method. A black matrix comprising chromium(Cr) is interposed between the color filters. The black matrix 51 is to block the light rays incident between the pixels through the glass substrate 60, which can prevent displaying undesired colors due to overlapping of the adjacent color filters 52R, 52G, 52B. Although the black matrix is illustrated to be formed of chromium in FIG. 2, to commonly known dyestuff may be used instead of chromium.

When the light rays incident through the glass substrate 60 pass the color filters 52R, 52G, 52B of red, green and blue corresponding to the operated pixels, the colors are displayed. However, the light rays are blocked in the black matrix. Such conventional color filter layers incorporating a black matrix are capable of blocking some incident light rays, but cannot prevent scattering of the light rays. If all incident light rays were to be completely blocked by the black matrix, the color display of the pixels would have a high contrast, thereby improving the resolution. However, the conventional black matrix comprising chromium or a dyestuff can not prevent the scattering of the light rays because of its inherent characteristics. Thus, the scattering of the light rays from the black matrix affects the color filters so as to reduce the contrast.

SUMMARY OF THE INVENTION

The object of the present invention is to provide a color filter layer of a liquid crystal display comprising a black matrix having a light absorbing layer which absorbs the incident light rays so as to prevent the scattering of the light rays.

According to the present invention, a color filter layer comprises a black matrix having a three-layer structure obtained by sequentially depositing a silicon nitride film, a light absorbing layer and a chromium layer on the glass substrate contacting the color filters.

BRIEF DESCRIPTION OF THE ATTACHED DRAWINGS

FIG. 1 schematically illustrates the structure of a conventional liquid crystal display;

FIG. 2 illustrates the structure of the color filter layer of FIG. 1 on an enlarged scale; and FIG. 3 illustrates the structure of the color filter layer according to the present invention.

DETAILED DESCRIPTION OF THE INVENTION

The present invention will now be described with reference to FIG. 3 attached only by way of example.

Figure 1:
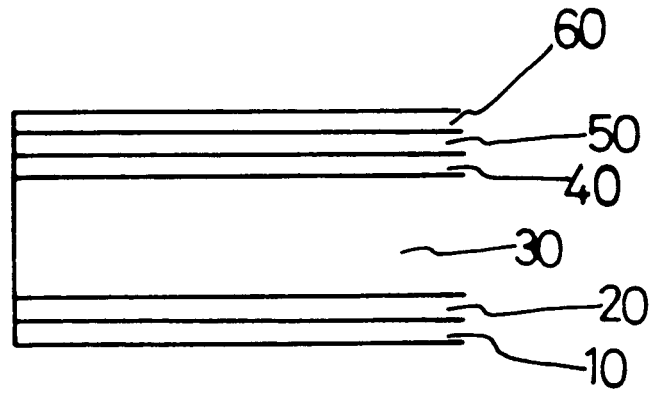
Figure 2:
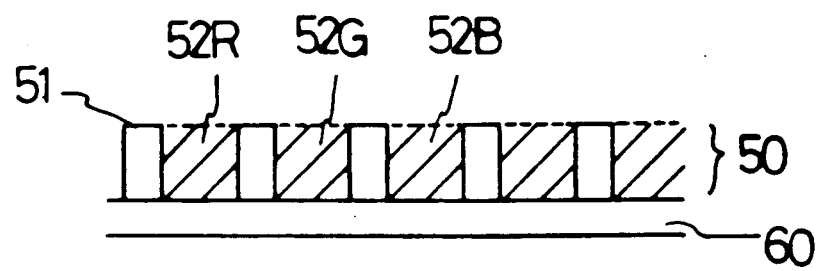
Figure 3:
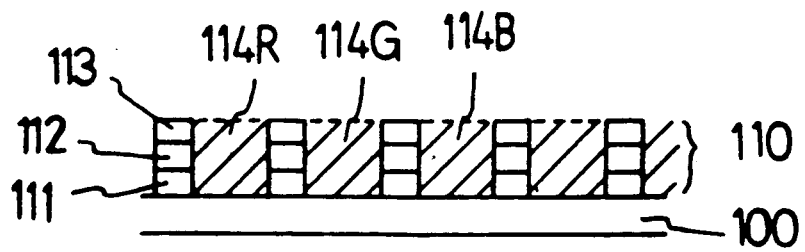

FIG. 3 is an illustration of the color filter layer of a liquid crystal display according to the present invention and the structures excepting a color filter layer are the same as the conventional liquid crystal display illustrated in FIG. 1.

In FIG. 3, reference number 100 indicates the upper glass substrate of the liquid crystal layer adhesive to a color filter layer (110) of the present invention.

Referring to FIG. 3, the color filter layer 110 comprises an array of red, green and blue color filters 114R, 114G, 114B and a black matrix according to the present invention. The color filters are deposited in a conventional manner.

The aforesaid black matrix is obtained by sequentially depositing a silicon nitride film 111, a light absorbing layer 112, and a chromium layer 113 on the upper transparent glass substrate 100, said layers 111-113 being interspersed between the red, green and blue color filters. Since the silicon nitride 111 of the black matrix is formed of SiNx, it facilitates the strong adhesion between the light absorbing layer 112 and the glass substrate 100. The light absorbing layer 112 is formed of SiGe for absorbing the light rays coming through the glass substrate 100 and the silicon nitride 111. The chromium layer 113 is deposited on the light absorbing layer 112, blocking the residual light rays passing the light absorbing layer 112 without scattering of the light rays.

The color filter layer 110 comprising a black matrix having such a three-layer structure and the red, green and blue color filters according to the present invention may be obtained by a conventional method such as printing, photosensitive filming, vaccum deposition, electroplating, dyeing, etc. Considering the production cost, the black matrix according to the present invention is preferably obtained by using the dyeing method which ensures a good color presentation.

As described above, because the inventive black matrix comprises a silicon nitride film, a light absorbing layer and a chromium layer sequentially deposited on the glass substrate, most of the incident light rays through the glass substrate and the silicon nitride are absorbed by the light absorbing layer of SiGe, and the residual light rays passing the light absorbing layer are blocked by the chromium layer without scattering thereof. Namely, the black matrix according to the present invention considerably reduces the scattering of the incident light rays so as to improve the contrast and thereby making better the picture resolution of the liquid crystal display.

What is claimed is:

1. In a liquid crystal display comprising upper and lower transparent glass substrates, an array of thin film transistors, and a liquid crystal layer sealingly filled between said upper and lower glass substrates, a color filter layer is provided, comprising:

a plurality of color filters arranged in a mosaic pattern on the upper glass substrate, said color filters comprising red, green and blue dyes;

a black matrix disposed between said color filters to block the light rays incident between them, said black matrix having a three-layer structure, comprising a silicon nitride film, a light absorbing layer and a chromium layer sequentially deposited on said upper glass substrate.

2. A color filter layer as claimed in claim 1, wherein said light absorbing layer is formed of SiGe.

* * * * *